United States Patent
Farmer et al.

(10) Patent No.: US 12,070,050 B2
(45) Date of Patent: *Aug. 27, 2024

(54) ORGANIC FOOD PRESERVATIVE COMPOSITIONS

(71) Applicant: LOCUS SOLUTIONS IPCO, LLC, Solon, OH (US)

(72) Inventors: Sean Farmer, Ft. Lauderdale, FL (US); Ken Alibek, Solon, OH (US)

(73) Assignee: LOCUS SOLUTIONS IPCO, LLC, Solon, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/329,057

(22) Filed: Jun. 5, 2023

(65) Prior Publication Data

US 2023/0309585 A1 Oct. 5, 2023

Related U.S. Application Data

(63) Continuation of application No. 16/954,062, filed as application No. PCT/US2018/065898 on Dec. 16, 2018, now Pat. No. 11,666,074.

(60) Provisional application No. 62/610,414, filed on Dec. 26, 2017, provisional application No. 62/637,755, filed on Mar. 2, 2018.

(51) Int. Cl.
| | |
|---|---|
| A23L 3/3571 | (2006.01) |
| A23L 3/3508 | (2006.01) |
| A23L 3/3526 | (2006.01) |

(52) U.S. Cl.
CPC ........... A23L 3/3571 (2013.01); A23L 3/3508 (2013.01); A23L 3/3526 (2013.01); *A23V 2002/00* (2013.01)

(58) Field of Classification Search
CPC ..... A23L 3/3571; A23L 3/3508; A23L 3/3526
USPC ........................................................ 426/335
See application file for complete search history.

(56) References Cited

U.S. PATENT DOCUMENTS

| | | | |
|---|---|---|---|
| 3,192,124 | A | 6/1965 | Kheshgi et al. |
| 6,524,631 | B1 | 2/2003 | Dicks |
| 11,666,074 | B2 * | 6/2023 | Farmer .................. A23L 3/3526 426/335 |
| 2003/0228402 | A1 | 12/2003 | Franklin et al. |
| 2005/0266036 | A1 | 12/2005 | Awada et al. |
| 2006/0172040 | A1 | 8/2006 | Tilley et al. |
| 2010/0254957 | A1 | 10/2010 | Hua |
| 2011/0033436 | A1 | 2/2011 | Chen et al. |
| 2011/0044972 | A1 | 2/2011 | Fieldhouse et al. |
| 2011/0256282 | A1 | 10/2011 | Piechocki et al. |
| 2012/0220464 | A1 | 8/2012 | Giessler-Blank et al. |
| 2013/0324406 | A1 | 12/2013 | Chisholm et al. |
| 2014/0178444 | A1 | 6/2014 | Stadler et al. |
| 2014/0342437 | A1 | 11/2014 | Carpenter et al. |
| 2015/0037302 | A1 | 2/2015 | Bralkowski et al. |
| 2015/0045288 | A1 | 2/2015 | Mygind et al. |
| 2015/0045290 | A1 | 2/2015 | Coutte et al. |
| 2015/0342197 | A1 | 12/2015 | King et al. |
| 2016/0073642 | A1 | 3/2016 | Ceballos Rojas et al. |
| 2016/0083757 | A1 | 3/2016 | Fonseca et al. |
| 2016/0251565 | A1 | 9/2016 | Yanagisawa et al. |
| 2017/0044632 | A1 | 2/2017 | Anderson et al. |
| 2017/0071837 | A1 | 3/2017 | Schelges et al. |
| 2018/0000876 | A1 | 1/2018 | Yamamoto et al. |

FOREIGN PATENT DOCUMENTS

| | | |
|---|---|---|
| CN | 101057590 A | 10/2007 |
| CN | 101611843 A | 12/2009 |
| CN | 101886047 A | 11/2010 |
| CN | 104114710 A | 10/2014 |
| CN | 105360284 A | 3/2016 |
| CN | 105567580 A | 5/2016 |
| CN | 105861346 A | 8/2016 |
| EP | 2090172 A1 | 8/2009 |
| JP | 2014034552 A | 2/2014 |
| WO | 200054575 A2 | 9/2000 |
| WO | 2005117929 A1 | 12/2005 |
| WO | 2007140277 A1 | 12/2007 |
| WO | 2011134998 A1 | 11/2011 |
| WO | 2013110132 A1 | 8/2013 |
| WO | 2015024751 A1 | 2/2015 |
| WO | 2017035099 A1 | 3/2017 |
| WO | 2017044953 A1 | 3/2017 |
| WO | 2018049182 A2 | 3/2018 |
| WO | 2018094075 A1 | 5/2018 |
| WO | 2019067380 A2 | 4/2019 |
| WO | 2019140439 A1 | 7/2019 |

OTHER PUBLICATIONS

Chong, H., et al., "Microbial Production of Rhamnolipids: Opportunities, Challenges and Strategies." Microbial Cell Factories, 2017, 16(137): 1-12.

Coronel-Leon, J., et al., "Optimizing the Production of the Biosurfactant Lichenysin and its Application in Biofilm Control." Journal of Applied Microbiology, 2015, 120: 99-111.

De Brito, D., Biosurfactants from renewable raw materials, Universidade do Minho Departamento de Engenharia Biologica, Nov. 2013: 1-93.

De Oliveira, M., et al., "Review: Sophorolipids A Promising Biosurfactant and it's Applications." International Journal of Advanced Biotechnology and Research, 2015, 6(2): 161-174.

Henkel, T., "Application of biosurfactants as antimicrobial additive in food and beverage." SuperBIO Workshop Biosurfactants, Bio Base Europe Pilot Plant, Apr. 3, 2017, <retrieved from the internet: URL: http://www.carbosurf.eu/wp-content/uploads/2017/06/CARBOSURF-User-group-meeting_xylolipids-INS-presentation-1.pdf [retrieved on Nov. 16, 2021]>.

(Continued)

*Primary Examiner* — Hamid R Badr
(74) *Attorney, Agent, or Firm* — SALIWANCHIK, LLOYD & EISENSCHENK

(57) ABSTRACT

The subject invention provides compositions and methods for preserving food products. Specifically, the subject compositions and methods can be used to prolong the consumable life of food products, as well as to reduce and/or prevent spoilage and/or contamination by microbial agents. Preferably, the compositions comprise a blend of one or more glycolipids and one or more lipopeptides. Even more preferably, the compositions comprise sophorolipids and surfactin, lichenysin or another lipopeptide biosurfactant.

9 Claims, No Drawings

(56) References Cited

OTHER PUBLICATIONS

Klich, M. A., et al. "Iturin A: a potential new fungicide for stored grains." Mycopathologia 127 (1994): 123-127.
Magalhaes, L., et al., "Antimicrobial activity of rhamnolipids against Listeria monocytogenes and their synergistic interaction with nisin." Food Control, 2013, 29: 138-142.
Meena, K. R., "Lipopeptides as the Antifungal and Antibacterial Agents: Applications in Food Safety and Therapeutics." BioMed Research International, Oct. 2015: 1-9.
Nitschke, M., et al., "Production and properties of a surfactant obtained from Bacillus subtilis grown on cassava wastewater." Bioresource Technology, 2006, 97: 336-341.
Romero, D., et al., "The Iturin and Fengycin Families of Lipopeptides Are Key Factors in Antagonism of Bacillus Subtilis Toward Podosphaera Fusca." Molecular Plant-Microbe Interactions, 2007, 20(4): 430-440.
Santos, D.K.F., et al., "Biosurfactants: Multifunctional Biomolecules of the 21st Century." International Journal of Molecular Sciences, 2016, 17(401): 1-31.
Sen, R., "Biosurfactants: Advances in Experimental Medicine and Biology." Landes Bioscience and Springer Science +Business Media, LLC, 2010, 672: 1-331.
Sharma, A. et al., "A study on biosurfactant production in *Lactobacillus* and *Bacillus* sp." Int. J. Curr. Microbiol. App. Sci., 2014, 3(11): 723-733.

\* cited by examiner

ORGANIC FOOD PRESERVATIVE COMPOSITIONS

CROSS-REFERENCE TO RELATED APPLICATIONS

This application is a continuation application of U.S. patent application Ser. No. 16/954,062, filed Jun. 15, 2020; which is a National Stage Application of International Application No. PCT/US2018/065898, filed Dec. 16, 2018; which claims priority to U.S. Provisional Application Nos. 62/610,414, filed Dec. 26, 2017, and 62/637,755, filed Mar. 2, 2018, all of which are incorporated herein by reference in their entirety.

BACKGROUND OF THE INVENTION

Modernization of agricultural and food processing technologies has led to an increased need for methods of keeping consumable products fresh and safe throughout transport and shelf-life. In particular, fresh products, e.g., meat and produce, can be highly perishable, which dramatically affects their quality when arriving to distant markets, and reduces their value and safety for consumption. Damage or injury that can make food products undesirable for human consumption can be the result of, for example, insects and/or pests, physical injury, enzymatic degradation, and/or microbial activity.

When dealing with fresh food products, two important factors should be considered to retain the maximum possible value of the products. First, because produce and meat are sources of live or once-living tissue, many chemical and biochemical reactions can occur after harvesting. With produce, for example, some reactions may rapidly lead to over-ripening, or aging, and the loss of freshness.

Additionally, microbiological contamination must be delayed as long as possible, as it compromises food safety as well as the final quality of the product. Microbial growth may cause serious alterations, e.g., changes in smell, taste, color and/or texture. Microorganisms can also lead to food poisoning if the food product is not washed or cooked properly prior to consumption.

For example, the shelf span of fruits and vegetables, can be shortened by fungi and molds. One specific fungi that causes millions of dollars in loss for fruit and vegetable producers is *Botrytis cinerea*, which causes "gray rottenness." *B. cinerea* can infect more than 200 different vegetal species, both before and after picking. This pathogen can attack a crop at any stage of development, and can infect any part of the plant.

Other common microbial agents that can cause the spoilage and/or contamination of fresh food products include bacteria, such as *Campylobacter, Clostridrium, Salmonella, Staphylococcus, Moraxella, Photobacterium, Streptococcus, Xanthomonas campestris, Listeria monocytogenes, Escherichia coli*, and *Vibrio cholerae*; viruses, such as rotaviruses and hepatitis A; parasites, such as tapeworms; fungi, such as *Zygosaccharomyces, Debaryomyces hansenii, Saccharomyces, Candida*, and Dekkera/Brettanomyces; and molds, such as *Aspergillus, Fusarium, Cladosporium* and *Alternaria*.

Some prior art methods of preserving food products include cooking, which can reduce microbial activity, but can change the flavor, appearance and texture; freezing, which affects the texture and crispness; drying, which changes texture, flavor, crispness and appearance; the addition of films, such as wax films, which are not palatable; use of special anti-microbial packaging; and the addition of chemical preservatives (e.g., sodium benzoate or potassium sorbate), which can be harmful to consumers and can change the properties of the food. Natural substances such as salt, sugar, vinegar, alcohol, and diatomaceous earth are also used as traditional preservatives. Certain processes, such as pickling, smoking and salting can also be used to preserve food, but change the organoleptic properties significantly.

Another method is refrigeration, which can help to preserve characteristics such as crispness of produce and flavor of meats and cheeses; however, refrigeration cannot prevent microbial growth indefinitely. Furthermore, refrigeration might not be ideal if it adversely affects the texture and/or taste of a product. For example, potatoes can become sweet and gritty in the refrigerator due to the breakdown of starch into sugar.

Long-term storage of dry foodstuffs derived from or otherwise containing organic matter is also hampered by the potential contaminating growth of microorganisms, loss of flavor and/or decomposition resulting from oxidation over time, and the potential for the development of toxins, generally, over the useful shelf life of the product. Most foodstuff manufacturers compensate for this spoilage by adding chemical preservatives to the product. However, chemical preservatives can be harmful to consumers with long term exposure, and can sacrifice the quality, taste, and overall integrity of processed food. Those products that do not contain chemical preservatives have a short shelf life and are thus limited with regard to long-term use.

Thus, there is a need for safe, non-toxic, and effective methods and compositions for preserving foods.

BRIEF SUMMARY OF THE INVENTION

The subject invention relates to improving the safety and preservation of food products through the use of beneficial microbes and/or their growth by-products. Specifically, the subject invention provides biopreservative compositions, as well as methods for extending the consumable life of food products and for enhancing the safety of food products.

Advantageously, the microbe-based products and methods of the subject invention are environmentally-friendly and cost-effective. Furthermore, the subject invention utilizes components that are biodegradable, toxicologically safe and that meet the requirements for "organic" food status. Even further, the present invention can be used as a replacement for chemical preservatives to preserve food and prevent food-borne illnesses.

In preferred embodiments, the subject invention provides microbe-based biopreservative compositions comprising microorganisms and/or microbial growth by-products. Also provided are methods of cultivating the biopreservative compositions.

The biopreservative compositions can be obtained through cultivation processes ranging from small to large scale. These cultivation processes include, but are not limited to, submerged cultivation/fermentation, solid state fermentation (SSF), and modifications, hybrids or combinations thereof.

The composition may comprise, for example, live and/or unviable cells, fermentation medium, and/or microbial growth by-products. In one embodiment, the biopreservative composition comprises the microbial growth by-products separated from the microorganisms that produced them. The growth by-products can be in a purified or unpurified form.

In one embodiment, the microbial growth by-products of the subject composition comprise one or more biosurfactants. Biosurfactants according to the subject invention include, for example, low-molecular-weight glycolipids, cellobiose lipids, lipopeptides, flavolipids, phospholipids, and high-molecular-weight polymers such as lipoproteins, lipopolysaccharide-protein complexes, and/or polysaccharide-protein-fatty acid complexes.

In one embodiment, the biosurfactants comprise glycolipids such as, for example, rhamnolipids (RLP), sophorolipids (SLP), trehalose lipids or mannosylerythritol lipids (MEL). In one embodiment, the biosurfactants comprise lipopeptides, such as, e.g., surfactin, iturin, fengycin, viscosin and/or lichenysin. In one embodiment, the biosurfactants comprise polymeric biosurfactants, such as, for example, emulsan, lipomanan, alasan, and/or liposan.

In certain embodiments, the biopreservative composition comprises a blend of biosurfactants, said blend comprising one or more glycolipids and one or more lipopeptides.

In some embodiments, the biopreservative composition can comprise about 10 ppm to about 10,000 ppm of glycolipids. In some embodiments, the biopreservative composition can comprise about 1 ppm to about 5,000 ppm of lipopeptides.

Preferably, the total concentration of the biosurfactant blend in the biopreservative composition is about 0.001 to 5.0%, preferably from about 0.01 to 0.5%, more preferably about 0.01 to 0.1%. In one exemplary embodiment, the biopreservative composition comprises about 0.1% sophorolipid and 0.01% surfactin, lichenysin and/or other lipopeptides.

In some embodiments, the composition comprises microorganisms in addition to the microbial growth by-products. The microbes can be biosurfactant-producing yeasts, fungi and/or bacteria in a live or inactive state.

The biopreservative composition can also comprise appropriate additives and/or carriers depending on its formulation and intended use.

In some embodiments, methods are provided for extending the consumable life of food products, wherein a biopreservative composition of the subject invention is contacted with the food product. In preferred embodiments, the biopreservative composition comprises a blend of biosurfactants, said blend comprising one or more glycolipids and one or more lipopeptides.

In some embodiments, the method prevents and/or controls microbial growth in and/or on a food product. Thus, while preventing the alteration and/or decomposition of food products due to microbial growth, the method can also be used to enhance the safety of food products for consumption, e.g., by preventing food poisoning or illness from pathogenic food-borne microorganisms.

In some embodiments, the method can be used simultaneously with other methods of preservation. For example, the method can be used in combination with refrigeration, freezing and/or active packaging.

In some embodiments, the method can be used to reduce or eliminate the need for freezing foods to preserve them for longer than, for example, one week. This is particularly useful in the case of fresh butchered meats and fishes, which typically only remain fresh in the refrigerator for 1 to 5 days before spoiling.

In some embodiments, the compositions of the subject invention can be used in active packaging systems as a slow-release antimicrobial agent. According to these embodiments, the biopreservative compositions are incorporated in or on the material in which the food product is packaged, and are gradually released from the packaging rather than being applied directly to the food product.

In certain embodiments, methods are provided for cultivating a growth by-product of a microorganism by cultivating the microorganism under conditions favorable for growth and production of the growth by-product, and, optionally, purifying the growth by-product. Examples of growth by-products according to the subject invention include biosurfactants, biopolymers, enzymes, acids, solvents, ethanol, proteins, peptides, lipids, carbohydrates, amino acids, nucleic acids and others.

In certain embodiments, the cultivation method utilizes a biosurfactant-producing microorganism. In specific embodiments, the microbe is a biosurfactant-producing yeast, such as, for example, *Starmerella bombicola, Saccharomyces cerevisiae, Pseudozyma aphidis, Pichia guilliermondii* or *Pichia anomala* (*Wickerhamomyces anomalus*). These yeasts are effective producers of, e.g., glycolipid biosurfactants.

In some embodiments, the microbe is a biosurfactant-producing bacteria, such as, for example, *Pseudomonas aeruginosa* or *Rhodococcus erythropolis*, which are also effective producers of, e.g., glycolipid biosurfactants, and/or *Bacillus subtilis, Bacillus amyloliquefaciens* or *Bacillus licheniformis*, which are effective producers of, e.g., lipopeptide biosurfactants.

Advantageously, the compositions and methods of the subject invention can be effective for preserving food and preventing food-borne illnesses without negatively altering the taste, smell, appearance and/or texture of food products.

DETAILED DESCRIPTION

The subject invention relates to improving the safety and preservation of food products through the use of beneficial microbes and/or their growth by-products. Specifically, the subject invention provides biopreservative compositions, as well as methods for extending the consumable life of food products and for enhancing the safety of food products.

Advantageously, the microbe-based products and methods of the subject invention are environmentally-friendly and cost-effective. Furthermore, the subject invention utilizes components that are biodegradable, toxicologically safe and that meet the requirements for "organic" food status. Even further, the present invention can be used as a replacement for chemical preservatives to preserve food and prevent food-borne illnesses.

In preferred embodiments, the subject invention provides microbe-based preservative compositions comprising microorganisms and/or microbial growth by-products. In some embodiments, the composition comprises a blend of one or more glycolipids and one or more lipopeptides. Also provided are methods of cultivating the biopreservative compositions.

In certain embodiments, methods are provided for extending the consumable life of food products, wherein a biopreservative composition of the subject invention is contacted with the food product.

In some embodiments, the method can prevent and/or control harmful microbial growth in and/or on the food product. Thus, while preventing the alteration and/or decomposition of food products due to microbial growth, the method can also be used to enhance the safety of food products, e.g., by preventing food poisoning from pathogenic food-borne microorganisms.

Selected Definitions

As used herein, reference to a "microbe-based composition" means a composition that comprises components that were produced as the result of the growth of microorganisms or other cell cultures (e.g., a biopreservative composition of the subject invention). Thus, the microbe-based composition may comprise the microbes themselves and/or by-products of microbial growth. The microbes may be in a vegetative state, in spore form, in mycelial form, in any other form of propagule, or a mixture of these. The microbes may be planktonic or in a biofilm form, or a mixture of both. The by-products of growth may be, for example, metabolites, cell membrane components, expressed proteins, and/or other cellular components. The microbes may be intact or lysed. In some embodiments, the microbes are present, with medium in which they were grown, in the microbe-based composition. The cells may be present at, for example, a concentration of $1\times10^4$, $1\times10^5$, $1\times10^6$, $1\times10^7$, $1\times10^8$, $1\times10^9$, $1\times10^{10}$, $1\times10^{11}$, $1\times10^{12}$, $1\times10^{13}$ or more CFU/milliliter of the composition. In some embodiments, the composition comprises growth by-products that have been separated from the microbes that produced them.

The subject invention further provides "microbe-based products," which are products that are to be applied in practice to achieve a desired result. The microbe-based product can be simply the microbe-based composition harvested from the microbe cultivation process. Alternatively, the microbe-based product may have components removed, or may comprise further ingredients that have been added. These additional ingredients can include, for example, stabilizers, buffers, appropriate carriers, such as water, salt solutions, or any other appropriate carrier, added nutrients to support further microbial growth, non-nutrient growth enhancers, and/or agents that facilitate tracking of the microbes and/or the composition in the environment to which it is applied. The microbe-based product may also comprise mixtures of microbe-based compositions. The microbe-based product may also comprise one or more components of a microbe-based composition that have been processed in some way such as, but not limited to, filtering, centrifugation, lysing, drying, purification and the like.

As used herein, a "biofilm" is a complex aggregate of microorganisms, such as bacteria, wherein the cells adhere to each other. The cells in biofilms are physiologically distinct from planktonic cells of the same organism, which are single cells that can be motile in a liquid medium or on a solid medium.

As used herein, the term "consumable life" means the length of time a product is fit for consumption by humans or other animal subjects. In the context of food products, consumable life includes the length of time the food product is safe for consumption, e.g., able to be consumed by a subject without causing harm to the subject or making the subject ill, and the length of time the food product is palatable, e.g., has not lost characteristics such as nutritional value, taste, smell, texture or appearance that make the food product desirable for consumption.

As used herein, the term "control" used in reference to a harmful microorganism or a pest means killing, disabling, immobilizing, or reducing population numbers of the harmful microorganism or pest, or otherwise rendering the harmful microorganism or pest substantially incapable of causing harm.

As used herein, an "isolated" or "purified" nucleic acid molecule, polynucleotide, polypeptide, protein or organic compound such as a small molecule (e.g., those described below), is substantially free of other compounds, such as cellular material, with which it is associated in nature. A purified or isolated polynucleotide (ribonucleic acid (RNA) or deoxyribonucleic acid (DNA)) is free of the genes or sequences that flank it in its naturally-occurring state. A purified or isolated polypeptide is free of the amino acids or sequences that flank it in its naturally-occurring state. A purified or isolated microbial strain means that the strain is removed from the environment in which it exists in nature. Thus, the isolated strain may exist as, for example, a biologically pure culture, or as spores (or other forms of the strain) in association with a carrier.

In certain embodiments, purified compounds are at least 60% by weight (dry weight) the compound of interest. Preferably, the preparation is at least 75%, more preferably at least 90%, and most preferably at least 99%, by weight the compound of interest. For example, a purified compound is one that is at least 90%, 91%, 92%, 93%, 94%, 95%, 98%, 99%, or 100% (w/w) of the desired compound by weight. Purity is measured by any appropriate standard method, for example, by column chromatography, thin layer chromatography, or high-performance liquid chromatography (HPLC) analysis.

A "metabolite" refers to any substance produced by metabolism (e.g., a growth by-product) or a substance necessary for taking part in a particular metabolic process. A metabolite can be an organic compound that is a starting material (e.g., glucose), an intermediate (e.g., acetyl-CoA) in, or an end product (e.g., n-butanol) of metabolism. Examples of metabolites include, but are not limited to, biosurfactants biopolymers, enzymes, toxins, acids, solvents, alcohols, proteins, peptides, amino acids, lipids, carbohydrates, vitamins, minerals, and microelements.

As used herein, a "pest" is any organism, other than a human, that is destructive, deleterious and/or detrimental to humans or human concerns (e.g., food safety). Pests may cause and/or carry agents that cause infections, infestations and/or disease. Pests may be single- or multi-cellular organisms, including but not limited to, viruses, fungi, bacteria, archaea, parasites, protozoa, arthropods and/or nematodes.

As used herein, the term "preservative" means a substance or chemical that prevents undesirable microbial growth and/or undesirable chemical changes in a product, which can lead to decomposition of the product. In the context of food products, preservatives are also useful for preventing food-borne illnesses, decreasing microbial spoilage, and/or preserving fresh attributes and nutritional quality of the food.

As used herein, "prevention" means avoiding, delaying, forestalling, or minimizing the onset or progression of a particular occurrence or situation (e.g., contamination, illness). Prevention can include, but does not require, absolute or complete prevention, meaning the occurrence or situation may still develop at a later time than it would without preventative measures. Prevention can include reducing the severity of the onset of an occurrence or situation, and/or inhibiting the progression of the occurrence or situation to one that is more severe.

As used herein, "reduces" means a negative alteration, and "increases" means a positive alteration, wherein the alteration is at least 0.001%, 0.01%, 0.1%, 1%, 5%, 10%, 15%, 20%, 25%, 30%, 35%, 45%, 50%, 55%, 60%, 65%, 70%, 75%, 80%, 85%, 90%, 95%, 99%, or 100%, inclusive of all values therebetween.

As used herein, "reference" means a standard or control condition.

As used herein, a "salt-tolerant" microbial strain is capable of growing in a sodium chloride concentration of fifteen (15) percent or greater. In a specific embodiment, "salt-tolerant" refers to the ability to grow in 150 g/L or more of NaCl.

As used herein, the term "spoilage" means the spoiling, deterioration and/or contamination of a food product to the point that it is inedible, or its quality for edibility becomes reduced. Food that is capable of spoilage is called "perishable food."

As used herein, "surfactant" means a surface active compound that lowers the surface tension (or interfacial tension) between two liquids or between a liquid and a solid. Surfactants act as, e.g., detergents, wetting agents, emulsifiers, foaming agents, and dispersants. A biosurfactant is a surface active agent produced by a living cell, e.g., a microbe.

The transitional term "comprising," which is synonymous with "including," or "containing," is inclusive or open-ended and does not exclude additional, unrecited elements or method steps. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

Unless specifically stated or obvious from context, as used herein, the term "or" is understood to be inclusive. Unless specifically stated or obvious from context, as used herein, the terms "a," "and" and "the" are understood to be singular or plural.

Unless specifically stated or obvious from context, as used herein, the term "about" is understood as within a range of normal tolerance in the art, for example, within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value.

Ranges provided herein are understood to be shorthand for all of the values within the range. For example, a range of 1 to 20 is understood to include any number, combination of numbers, or sub-range from the group consisting 1, 2, 3, 4, 5, 6, 7, 8, 9, 10, 11, 12, 13, 14, 15, 16, 17, 18, 19, 20, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

The recitation of a listing of chemical groups in any definition of a variable herein includes definitions of that variable as any single group or combination of listed groups. The recitation of an embodiment for a variable or aspect herein includes that embodiment as any single embodiment or in combination with any other embodiments or portions thereof.

Any compositions or methods provided herein can be combined with one or more of any of the other compositions and methods provided herein Other features and advantages of the invention will be apparent from the following description of the preferred embodiments thereof, and from the claims. All references cited herein are hereby incorporated by reference.

Compositions According to the Subject Invention

In one embodiment, the subject invention provides microbe-based biopreservative compositions comprising microorganisms and/or microbial growth by-products.

The biopreservative compositions can be obtained through cultivation processes ranging from small to large scale. These cultivation processes include, but are not limited to, submerged cultivation/fermentation, solid state fermentation (SSF), and modifications, hybrids or combinations thereof.

The composition may comprise, for example, live and/or unviable cells, fermentation medium, and/or microbial growth by-products. In one embodiment, the biopreservative composition comprises the microbial growth by-products separated from the microorganisms that produced them. The growth by-products can be in a purified or unpurified form. Purification can be performed using known methods, for example, using a rotoevaporator, microfiltration, ultrafiltration, or chromatography.

In preferred embodiments, the growth by-products comprise a blend of biosurfactants.

Biosurfactants are a structurally diverse group of surface-active substances produced by microorganisms. Biosurfactants are biodegradable and can be efficiently produced, according to the subject invention, using selected organisms on renewable substrates. Most biosurfactant-producing organisms produce biosurfactants in response to the presence of a hydrocarbon source (e.g., oils, sugar, glycerol, etc.) in the growing media. Other media components such as concentration of iron can also affect biosurfactant production significantly.

Microbial biosurfactants are produced by a variety of microorganisms such as bacteria, fungi, and yeasts. Exemplary biosurfactant-producing microorganisms include *Starmerella* spp. (e.g., *S. bombicola*), *Pseudomonas* spp. (e.g., *P. aeruginosa, P. putida, P. florescens, P. fragi, P. syringae*); *Flavobacterium* spp.; *Bacillus* spp. (e.g., *B. subtilis, B. amyloliquefaciens, B. pumillus, B. cereus, B. licheniformis*); *Wickerhamomyces* spp. (e.g., *W. anomalus*), *Candida* spp. (e.g., *C. albicans, C. rugosa, C. tropicalis, C. lipolytica, C. torulopsis*); *Saccharomyces* (e.g., *S. cerevisiae*); *Pseudozyma* spp. (e.g., *P. aphidis*); *Rhodococcus* spp. (e.g., *R. erythropolis*); *Arthrobacter* spp.; *Campylobacter* spp.; *Corynebacterium* spp.; *Pichia* spp. (e.g., *P. guilliermondii, P. occidentalis*); as well as others.

Biosurfactants are amphiphiles. They consist of two parts: a polar (hydrophilic) moiety and non-polar (hydrophobic) group. Due to their amphiphilic structure, biosurfactants increase the surface area of hydrophobic water-insoluble substances, increase the water bioavailability of such substances, and change the properties of bacterial cell surfaces.

Biosurfactants accumulate at interfaces, thus reducing interfacial tension and leading to the formation of aggregated micellar structures in solution. The ability of biosurfactants to form pores and destabilize biological membranes permits their use as, e.g., antibacterial and antifungal agents.

Biosurfactants according to the subject invention include, for example, low-molecular-weight glycolipids, cellobiose lipids, lipopeptides, flavolipids, phospholipids, and high-molecular-weight polymers such as lipoproteins, lipopolysaccharide-protein complexes, and/or polysaccharide-protein-fatty acid complexes.

The hydrocarbon chain of a fatty acid acts as the common lipophilic moiety of a biosurfactant molecule, whereas the hydrophilic part is formed by ester or alcohol groups of neutral lipids, by the carboxylate group of fatty acids or amino acids (or peptides), organic acid in the case of flavolipids, or, in the case of glycolipids, by the carbohydrate.

In one embodiment, the biosurfactants according to the subject compositions comprise glycolipids and/or glycolipid-like biosurfactants, such as, for example, rhamnolipids (RLP), sophorolipids (SLP), trehalose lipids or mannosylerythritol lipids (MEL). In one embodiment, the biosurfactants comprise lipopeptides and/or lipopeptide-like biosurfactants, such as, e.g., surfactin, iturin, fengycin, viscosin and/or lichenysin. In one embodiment, the biosurfactants comprise polymeric biosurfactants, such as, for example, emulsan, lipomanan, alasan, and/or liposan.

In certain embodiments, the biopreservative composition comprises a blend of biosurfactants, said blend comprising one or more glycolipids and one or more lipopeptides.

In some embodiments, the biopreservative composition can comprise about 10 ppm to about 10,000 ppm of glycolipids, or about 100 ppm to about 5,000 ppm, or about 200 to about 1,000 ppm, or about 300 ppm to about 800 ppm, or about 500 ppm.

In some embodiments, the biopreservative composition can comprise about 1 ppm to about 5,000 ppm of lipopeptides, or about 10 ppm to about 1,000 ppm, or about 20 ppm to about 500 ppm, or about 50 ppm to about 300 ppm, or about 100 ppm.

In some embodiments, the total concentration of the biosurfactant blend in the biopreservative composition is about 0.001 to about 5.0%, or about 0.005% to about 1.0%, or about 0.01% to about 0.1%, or about 0.05%.

In one exemplary embodiment, the biopreservative composition comprises about 0.1% sophorolipid and 0.01% surfactin, lichenysin and/or other lipopeptides.

In some embodiments, the composition comprises microorganisms, either live or inactive, in addition to the microbial growth by-products. The microbes can be, for example, biosurfactant-producing yeasts, fungi and/or bacteria in a live or inactive state.

In one embodiment, the composition can comprise other microbial growth by-products and/or metabolites that can be useful for food preservation, including, for example, enzymes, biopolymers, solvents, acids or proteins.

The preservative composition can also comprise appropriate additives depending on its formulation and intended use, for example, buffering agents, carriers, other microbe-based compositions produced at the same or different facility, viscosity modifiers, tracking agents, biocides, surfactants, emulsifying agents, lubricants, solubility controlling agents, pH adjusting agents, and stabilizers.

Growth of Microbes

The subject invention provides methods for cultivation of microorganisms and production of microbial metabolites and/or other by-products of microbial growth. In one embodiment, the subject invention provides materials and methods for the production of biomass (e.g., viable cellular material), extracellular metabolites (e.g., small molecules and excreted proteins), residual nutrients and/or intracellular components (e.g., enzymes and other proteins).

The growth vessel used for growing microorganisms can be any fermenter or cultivation reactor for industrial use. In one embodiment, the vessel may have functional controls/sensors or may be connected to functional controls/sensors to measure important factors in the cultivation process, such as pH, oxygen, pressure, temperature, agitator shaft power, humidity, viscosity and/or microbial density and/or metabolite concentration.

In a further embodiment, the vessel may also be able to monitor the growth of microorganisms inside the vessel (e.g., measurement of cell number and growth phases). Alternatively, a daily sample may be taken from the vessel and subjected to enumeration by techniques known in the art, such as dilution plating technique. Dilution plating is a simple technique used to estimate the number of microbes in a sample. The technique can also provide an index by which different environments or treatments can be compared.

In one embodiment, the method includes supplementing the cultivation with a nitrogen source. The nitrogen source can be, for example, potassium nitrate, ammonium nitrate ammonium sulfate, ammonium phosphate, ammonia, urea, and/or ammonium chloride. These nitrogen sources may be used independently or in a combination of two or more.

The method can provide oxygenation to the growing culture. One embodiment utilizes slow motion of air to remove low-oxygen containing air and introduce oxygenated air. In the case of submerged fermentation, the oxygenated air may be ambient air supplemented daily through mechanisms including impellers for mechanical agitation of the liquid, and air spargers for supplying bubbles of gas to the liquid for dissolution of oxygen into the liquid.

The method can further comprise supplementing the cultivation with a carbon source. The carbon source is typically a carbohydrate, such as glucose, sucrose, lactose, fructose, trehalose, mannose, mannitol, and/or maltose; organic acids such as acetic acid, fumaric acid, citric acid, propionic acid, malic acid, malonic acid, and/or pyruvic acid; alcohols such as ethanol, isopropyl, propanol, butanol, pentanol, hexanol, isobutanol, and/or glycerol; fats and oils such as soybean oil, rice bran oil, canola oil, olive oil, corn oil, sesame oil, and/or linseed oil; etc. These carbon sources may be used independently or in a combination of two or more.

In one embodiment, the method comprises use of two carbon sources, one of which is a saturated oil selected from canola, vegetable, corn, coconut, olive, or any other oil suitable for use in, for example, cooking. In a specific embodiment, the saturated oil is 15% canola oil or discarded oil that has been used for cooking.

In one embodiment, the microorganisms can be grown on a solid or semi-solid substrate, such as, for example, corn, wheat, soybean, chickpeas, beans, oatmeal, pasta, rice, and/or flours or meals of any of these or other similar substances.

In one embodiment, growth factors and trace nutrients for microorganisms are included in the medium. This is particularly preferred when growing microbes that are incapable of producing all of the vitamins they require. Inorganic nutrients, including trace elements such as iron, zinc, copper, manganese, molybdenum and/or cobalt may also be included in the medium. Furthermore, sources of vitamins, essential amino acids, and microelements can be included, for example, in the form of flours or meals, such as corn flour, or in the form of extracts, such as yeast extract, potato extract, beef extract, soybean extract, banana peel extract, and the like, or in purified forms. Amino acids such as, for example, those useful for biosynthesis of proteins, can also be included.

In one embodiment, inorganic salts may also be included. Usable inorganic salts can be potassium dihydrogen phosphate, dipotassium hydrogen phosphate, disodium hydrogen phosphate, magnesium sulfate, magnesium chloride, iron sulfate, iron chloride, manganese sulfate, manganese chloride, zinc sulfate, lead chloride, copper sulfate, calcium chloride, calcium carbonate, sodium chloride and/or sodium carbonate. These inorganic salts may be used independently or in a combination of two or more.

In some embodiments, the method for cultivation may further comprise adding additional acids and/or antimicrobials in the liquid medium before and/or during the cultivation process. Antimicrobial agents or antibiotics are used for protecting the culture against contamination. Additionally, antifoaming agents may also be added to prevent the formation and/or accumulation of foam when gas is produced during cultivation.

The pH of the mixture should be suitable for the microorganism of interest. Buffers, and pH regulators, such as carbonates and phosphates, may be used to stabilize pH near a preferred value. When metal ions are present in high concentrations, use of a chelating agent in the liquid medium may be necessary.

The method and equipment for cultivation of microorganisms and production of the microbial by-products can be performed in a batch, quasi-continuous, or continuous processes.

In one embodiment, the method for cultivation of microorganisms is carried out at about 5° to about 100° C., preferably, 15 to 60° C., more preferably, 25 to 50° C. In a further embodiment, the cultivation may be carried out continuously at a constant temperature. In another embodiment, the cultivation may be subject to changing temperatures.

In one embodiment, the equipment used in the method and cultivation process is sterile. The cultivation equipment such as the reactor/vessel may be separated from, but connected to, a sterilizing unit, e.g., an autoclave. The cultivation equipment may also have a sterilizing unit that sterilizes in situ before starting the inoculation. Air can be sterilized by methods know in the art. For example, the ambient air can pass through at least one filter before being introduced into the vessel. In other embodiments, the medium may be pasteurized or, optionally, no heat at all added, where the use of low water activity and low pH may be exploited to control undesirable bacterial growth.

In one embodiment, the subject invention provides methods of producing a microbial metabolite by cultivating a microbe strain of the subject invention under conditions appropriate for growth and production of the metabolite; and, optionally, purifying the metabolite. In a specific embodiment, the metabolite is a biosurfactant. The metabolite may also be, for example, ethanol, lactic acid, beta-glucan, proteins, amino acids, peptides, metabolic intermediates, polyunsaturated fatty acids, and lipids. The metabolite content produced by the method can be, for example, at least 20%, 30%, 40%, 50%, 60%, 70%, 80%, or 90%.

The biomass content of the fermentation medium may be, for example from 5 g/l to 180 g/l or more. In one embodiment, the solids content of the medium is from 10 g/l to 150 g/l.

The microbial growth by-product produced by microorganisms of interest may be retained in the microorganisms or secreted into the growth medium. In another embodiment, the method for producing microbial growth by-product may further comprise steps of concentrating and purifying the microbial growth by-product of interest. In a further embodiment, the medium may contain compounds that stabilize the activity of microbial growth by-product.

In one embodiment, all of the microbial cultivation composition is removed upon the completion of the cultivation (e.g., upon, for example, achieving a desired cell density, or density of a specified metabolite). In this batch procedure, an entirely new batch is initiated upon harvesting of the first batch.

In another embodiment, only a portion of the fermentation product is removed at any one time. In this embodiment, biomass with viable cells remains in the vessel as an inoculant for a new cultivation batch. The composition that is removed can be a microbe-free medium or contain cells, spores, mycelia, conidia or other microbial propagules. In this manner, a quasi-continuous system is created.

Advantageously, the methods of cultivation do not require complicated equipment or high energy consumption. The microorganisms of interest can be cultivated at small or large scale on site and utilized, even being still-mixed with their media. Similarly, the microbial metabolites can also be produced at large quantities at the site of need.

Microbial Strains Grown in Accordance with the Subject Invention

The microorganisms that can be grown according to the subject methods can be, for example, bacteria, yeast and/or fungi. These microorganisms may be natural, or genetically modified microorganisms. For example, the microorganisms may be transformed with specific genes to exhibit specific characteristics. The microorganisms may also be mutants of a desired strain. As used herein, "mutant" means a strain, genetic variant or subtype of a reference microorganism, wherein the mutant has one or more genetic variations (e.g., a point mutation, missense mutation, nonsense mutation, deletion, duplication, frameshift mutation or repeat expansion) as compared to the reference microorganism. Procedures for making mutants are well known in the microbiological art. For example, UV mutagenesis and nitrosoguanidine are used extensively toward this end.

In preferred embodiments, the microorganism is any yeast or fungus. Examples of yeast and fungus species suitable for use according to the current invention, include, but are not limited to, *Acaulospora, Aspergillus, Aureobasidium* (e.g., *A. pullulans*), *Blakeslea, Candida* (e.g., *C. albicans, C. apicola*), *Debaryomyces* (e.g., *D. hansenii*), *Entomophthora, Fusarium, Hanseniaspora* (e.g., *H. uvarum*), *Hansenula, Issatchenkia, Kluyveromyces, Mortierella, Mucor* (e.g., *M. piriformis*), *Penicillium, Phythium, Phycomyces, Pichia* (e.g., *P. anomala, P. guielliermondii, P. occidentalis, P. kudriavzevii*), *Pseudozyma* (e.g., *P. aphidis*), *Rhizopus, Saccharomyces* (*S. cerevisiae, S. boulardii* sequela, *S. torula*), *Starmerella* (e.g., *S. bombicola*), *Torulopsis, Thraustochytrium, Trichoderma* (e.g., *T. reesei, T. harzianum, T. virens*), *Ustilago* (e.g., *U. maydis*), *Wickerhamomyces* (e.g., *W. anomalus*), *Williopsis, Zygosaccharomyces* (e.g., *Z. bailii*).

In one embodiment, the microorganism is any yeast known as a "killer yeast." As used herein, "killer yeast" means a strain of yeast characterized by its secretion of toxic proteins or glycoproteins, to which the strain itself is immune. The exotoxins secreted by killer yeasts are capable of killing other strains of yeast, fungi, or bacteria. Killer yeasts can include, but are not limited to, *Wickerhamomyces, Pichia, Hansenula, Saccharomyces, Hanseniaspora, Ustilago Debaryomyces, Candida, Cryptococcus, Kluyveromyces, Torulopsis, Williopsis, Zygosaccharomyces* and others.

In a specific embodiment, the microbial strain is a *Pichia* yeast selected from *Pichia anomala* (*Wickerhamomyces anomalus*), *Pichia guilliermondii*, and *Pichia kudriavzevii*. *Pichia anomala*, in particular, is an effective producer of exo-β-1,3-glucanase, glycolipid biosurfactants that are capable of reducing surface/interfacial tension of water, as well as various other useful solvents, enzymes and metabolites, such as phytase, glycosidases, ethyl acetate, acetic acid, lactic acid, isopropyl alcohol and ethanol.

In one embodiment, the microorganism is *Starmerella bombicola, Pseudozyma aphidis*, or *Saccharomyces cerevisiae*, which are also effective producers of, for example, glycolipid biosurfactants.

In some embodiments, the microorganisms are bacteria, including Gram-positive and Gram-negative bacteria. Bacteria suitable for use according to the present invention include, for example, *Acinetobacter* (e.g., *A. calcoaceticus, A. venetianus*); *Agrobacterium* (e.g., *A. radiobacter*), *Azotobacter* (*A. vinelandii, A. chroococcum*), *Azospirillum* (e.g., *A. brasiliensis*), *Bacillus* (e.g., *B. amyloliquefaciens, B. firmus, B. laterosporus, B. licheniformis, B. megaterium, B. mucilaginosus, B. subtilis, B. coagulans* GBI-30 (BC30)), *Chlorobiaceae* spp., *Dyadobacter* fermenters, *Frankia* spp., Frateuria (e.g., *F. aurantia*), *Klebsiella* spp., *Microbacterium* (e.g., *M. laevaniformans*), *Pantoea* (e.g., *P. agglomerans*), *Pseudomonas* (e.g., *P. aeruginosa, P. chlororaphis, P. chlororaphis* subsp. *aureofaciens* (Kluyver), *P. putida*), *Rhizobium* spp., *Rhodospirillum* (e.g., *R. rubrum*), *Sphingomonas* (e.g., *S. paucimobilis*), and/or *Xanthomonas* spp.

In one embodiment, the microorganism is a *Bacillus* sp., such as, *B. subtilis, B. amyloliquefaciens*, or *B. licheniformis*, which are effective producers of lipopeptide biosurfactants.

In one embodiment, the microbe is a non-pathogenic strain of *Pseudomonas*. Preferably, the strain is a producer of glycolipid biosurfactants, including, for example, rhamnolipid biosurfactants (e.g., *P. aeruginosa*).

Other microbial strains can be used in accordance with the subject invention, including, for example, any other strains having high concentrations of mannoprotein and/or beta-glucan in their cell walls and/or that are capable of producing biosurfactants and other metabolites useful for preserving food.

Preparation of Microbe-Based Products

One microbe-based product of the subject invention is simply the fermentation medium containing the microorganism and/or the microbial metabolites produced by the microorganism and/or any residual nutrients. The product of fermentation may be used directly without extraction or purification. If desired, extraction and purification can be easily achieved using standard extraction and/or purification methods or techniques described in the literature.

The microorganisms in the microbe-based product may be in an active or inactive form, or the compositions may comprise combinations of active and inactive microorganisms. In some embodiments, the growth by-products of the microorganism is extracted from the medium in which it was produced, and, optionally, purified.

The microbe-based products may be used without further stabilization, preservation, and storage. Advantageously, direct usage of these microbe-based products preserves a high viability of the microorganisms, reduces the possibility of contamination from foreign agents and undesirable microorganisms, and maintains the activity of the by-products of microbial growth.

The microbes, growth by-products and/or medium resulting from the microbial growth can be removed from the growth vessel and transferred via, for example, piping for immediate use.

In other embodiments, the composition (microbes, medium, growth by-products, or combinations thereof) can be placed in containers of appropriate size, taking into consideration, for example, the intended use, the contemplated method of application, the size of the fermentation tank, and any mode of transportation from microbe growth facility to the location of use. Thus, the containers into which the microbe-based composition is placed may be, for example, from 1 gallon to 1,000 gallons or more. In other embodiments the containers are 2 gallons, 5 gallons, 25 gallons, or larger.

In certain embodiments, use of unpurified microbial growth by-products according to the subject invention can be superior to, for example, purified microbial metabolites alone, due to, for example, the advantageous properties of the yeast cell walls. These properties include high concentrations of mannoprotein as a part of yeast cell wall's outer surface (mannoprotein is a highly effective bioemulsifier) and the presence of biopolymer *beta*-glucan (an emulsifier) in yeast cell walls. Additionally, the yeast fermentation product further can comprise biosurfactants and other metabolites (e.g., lactic acid, ethyl acetate, ethanol, etc.) in the culture.

Upon harvesting the microbe-based composition from the growth vessels, further components can be added as the harvested product is placed into containers and/or piped (or otherwise transported for use). The additives can be, for example, buffers, carriers, other microbe-based compositions produced at the same or different facility, viscosity modifiers, preservatives, nutrients for microbe growth, tracking agents, solvents, biocides, other microbes and other ingredients specific for an intended use.

Other suitable additives, which may be contained in the formulations according to the invention, include substances that are customarily used for such preparations. Example of such additives include surfactants, emulsifying agents, lubricants, buffering agents, solubility controlling agents, pH adjusting agents, and stabilizers.

In one embodiment, the composition may further comprise buffering agents including organic and amino acids or their salts. Suitable buffers include citrate, gluconate, tartarate, malate, acetate, lactate, oxalate, aspartate, malonate, glucoheptonate, pyruvate, galactarate, glucarate, tartronate, glutamate, glycine, lysine, glutamine, methionine, cysteine, arginine and a mixture thereof. Phosphoric and phosphorous acids or their salts may also be used. Synthetic buffers are suitable to be used but it is preferable to use natural buffers such as organic and amino acids or their salts listed above.

In a further embodiment, pH adjusting agents include potassium hydroxide, ammonium hydroxide, potassium carbonate or bicarbonate, hydrochloric acid, nitric acid, sulfuric acid or a mixture.

In one embodiment, additional components such as an aqueous preparation of a salt or polyprotic acid, such as sodium bicarbonate or carbonate, sodium sulfate, sodium phosphate, sodium biphosphate, can be included in the formulation.

In one embodiment, additional components can be included to increase the efficacy of the treatment products, such as chelating agents and adherents.

In certain embodiments, an adherent substance can be added to the treatment to prolong the adherence of the product to food. Polymers, such as charged polymers, or polysaccharide-based substances can be used, for example, xanthan gum, guar gum, levan, xylinan, gellan gum, curdlan, pullulan, dextran and others.

In preferred embodiments, commercial grade xanthan gum is used as the adherent. The concentration of the gum should be selected based on the content of the gum in the commercial product. If the xanthan gum is highly pure, then 0.001% (w/v–xanthan gum/solution) is sufficient.

Advantageously, in accordance with the subject invention, the microbe-based product may comprise medium in which the microbes were grown. The product may be, for example, at least, by weight, 1%, 5%, 10%, 25%, 50%, 75%, or 100% growth medium. The amount of biomass in the product, by weight, may be, for example, anywhere from 0% to 100% inclusive of all percentages therebetween.

Optionally, the product can be stored prior to use. The storage time is preferably short. Thus, the storage time may be less than 60 days, 45 days, 30 days, 20 days, 15 days, 10 days, 7 days, 5 days, 3 days, 2 days, 1 day, or 12 hours. In a preferred embodiment, if live cells are present in the product, the product is stored at a cool temperature such as, for example, less than 200 C, 15° C., 10° C., or 5° C. On the other hand, a biosurfactant composition can typically be stored at ambient temperatures.

Methods of Preserving Food Products

In some embodiments, methods are provided for extending the consumable life of food products, wherein a biopreservative composition of the subject invention is applied to the food product.

Advantageously, the present invention can be practiced without utilizing large quantities of inorganic compounds. Additionally, the compositions and methods utilize components that are biodegradable and toxicologically safe, and can serve as replacements for potentially harmful preservatives, such as, for example, sodium benzoate and potassium sorbate. Thus, the present invention can be used for preserving food and preventing food-borne illnesses as a "green" treatment, and can even be utilized as a preservative for "organic" food products.

In preferred embodiments, the method comprises applying a biopreservative composition comprising a blend of biosurfactants to the food product, said biosurfactant blend comprising one or more glycolipids and one or more lipopeptides.

In an exemplary embodiment, the method comprises applying a blend of sophorolipids and surfactin and/or other lipopeptides. Preferably, the total concentration of biosurfactants applied ranges between about 0.001 to about 5.0%, or about 0.005% to about 1.0%, or about 0.01% to about 0.1%, or about 0.05%.

While the biopreservative composition is safe and non-toxic for consumption at the concentrations specified herein, in certain embodiments, if desired, the methods can further comprise washing the biopreservative from the food product with, e.g., water or vinegar, prior to consuming the product.

The methods can be used at any stage of food preparation, either by commercial or industrial food producers, or in the home kitchen by everyday consumers. This can include prior to harvesting of produce (e.g., spraying onto the leaves of leafy vegetables), after harvesting (e.g., applying to fruits and vegetables after picking, or spraying onto butchered meat), during transport and/or storage, or after purchase (e.g., in the home or restaurant).

As used herein, "application" can include contacting the microbe-based product directly with a food product. The preservative composition can be, for example, sprayed, misted, or mixed as a liquid or a dry powder, or applied as a gel, wax or paste to the food product. The food product can be dipped into the preservative composition, or it can be spread on using a brush, sponge, or cloth. The preservative composition can be mixed into the food product, for example, a beverage or cheese. The preservative composition can be processed into the food product, for example, into a processed snack food.

As used herein, the term "food product" refers to any substance, preparation, composition or object that is suitable for consumption, nutrition, oral hygiene or pleasure, and which are intended to be introduced into the human or animal oral cavity, to remain there for a certain period of time and then to either be swallowed or to be removed from the oral cavity again (e.g., chewing gum).

These products include all substances or products intended to be ingested by humans or animals in a processed (e.g., cereals), semi-processed (e.g., butchered meat) or unprocessed (or fresh) state (e.g., fresh produce). This also includes substances that are added to orally consumable products (particularly food and pharmaceutical products) during their production, treatment or processing and intended to be introduced into the human or animal oral cavity.

Food products according to the subject invention include processed and/or semi-processed products, such as: baking products (e.g., bread, dry biscuits, cake, and other pastries), sweets (e.g., chocolates, chocolate bar products, other bar products, fruit gum, coated tablets, hard caramels, toffees and caramels, and chewing gum), non-alcoholic beverages (e.g., cocoa, coffee, green tea, black tea, black or green tea beverages enriched with extracts of green or black tea, Rooibos tea, other herbal teas, fruit-containing lemonades, isotonic beverages, soft drinks, nectars, fruit and vegetable juices, and fruit or vegetable juice preparations), instant beverages (e.g., instant cocoa beverages, instant tea beverages, and instant coffee beverages), cereal products (e.g., breakfast cereals, muesli bars, and pre-cooked instant rice products), dairy products (e.g., whole fat or fat reduced or fat-free milk beverages, rice pudding, yoghurt, kefir, cream cheese, soft cheese, hard cheese, dried milk powder, whey, butter, buttermilk, and partly or wholly hydrolyzed products containing milk proteins), products from soy protein or other soy bean fractions (e.g., soy milk and products prepared thereof, beverages containing isolated or enzymatically treated soy protein, soy flour containing beverages, preparations containing soy lecithin, fermented products such as tofu or tempeh products prepared thereof and mixtures with fruit preparations and, optionally, flavoring substances), fruit preparations (e.g., jams, fruit ice cream, fruit sauces, and fruit fillings), vegetable preparations (e.g., ketchup, sauces, dried vegetables, deep-freeze vegetables, pre-cooked vegetables, and boiled vegetables), snack articles (e.g., baked or fried potato chips (crisps) or potato dough products, and extrudates on the basis of maize or peanuts), bread products (e.g., sliced bread, rolls, tortillas and muffins), products on the basis of fat and oil or emulsions thereof (e.g., mayonnaise, remoulade, and dressings), other ready-made meals and soups (e.g., dry soups, instant soups, and pre-cooked soups), seasonings (e.g., sprinkle-on seasonings), sweetener compositions (e.g., tablets, sachets, and other preparations for sweetening or whitening beverages or other food).

Food products can also include fresh foods, such as: fruits (e.g., stone fruits, berries, melons, *citrus*, drupes, dry and fleshy fruits), vegetables (e.g., bulb, flower, legume, tuber, leafy, stem and root vegetables), fungi, herbs, grains (e.g., wheat, corn, rice, millet, sorghum, chia, flax, *quinoa*), meat (e.g., poultry, sausage, beef, lamb, pork and wild game), seafood (e.g., fish, shellfish, mollusks), and eggs or egg products (e.g., egg whites and/or egg yolks).

Plant-based food products can come from a variety of different crops, such as, e.g. row crops (e.g., corn, soy, sorghum, peanuts, potatoes, etc.), field crops (e.g., alfalfa, wheat, grains, etc.), tree crops (e.g., walnuts, almonds, pecans, hazelnuts, pistachios, etc.), *citrus* crops (e.g., orange, lemon, grapefruit, etc.), fruit crops (e.g., apples, pears, etc.), turf crops, ornamentals crops (e.g., flowers, vines, etc.), vine crops (e.g., grapes, strawberries, blueberries, blackberries, etc.), forestry (e.g., pine, spruce, *eucalyptus*, poplar), and managed pastures (any mix of plants used to support grazing animals).

Further examples of food crop plants include, but are not limited to, corn (*Zea mays*), *Brassica* sp. (e.g., *B. napus, B. rapa, B. juncea*), particularly those *Brassica* species useful as sources of seed oil, alfalfa (*Medicago sativa*), rice (*Oryza sativa*), rye (*Secale cereale*), sorghum (*Sorghum bicolor, Sorghum vulgare*), millet (e.g., pearl millet (*Pennisetum glaucum*), proso millet (*Panicum miliaceum*), foxtail millet (*Setaria italica*), finger millet (*Eleusine coracana*)), sunflower (*Helianthus annuus*), safflower (Carthamus tinctorius), wheat (*Triticum aestivum*), soybean (*Glycine max*), tobacco (*Nicotiana tabacum*), potato (*Solanum tuberosum*), peanuts (*Arachis hypogaea*), cotton (*Gossypium barbadense, Gossypium hirsutum*), sweet potato (*Ipomoea batatus*), cassava (*Manihot esculenta*), coffee (*Coffea* spp.), coconut (*Cocos nucifera*), pineapple (*Ananas comosus*), citrus trees (*Citrus* spp.), cocoa (*Theobroma cacao*), tea (*Camellia sinensis*), banana (*Musa* spp.), avocado (*Persea americana*), fig (*Ficus casica*), guava (*Psidium guajava*), mango (*Mangifera indica*), olive (*Olea europaea*), *papaya* (*Carica papaya*), cashew (*Anacardium occidentale*), macadamia (*Macadamia integrifolia*), almond (*Prunus amygdalus*), sugar beets (*Beta vulgaris*), sugarcane (*Saccharum* spp.), oats, barley, vegetables, ornamentals, and conifers.

Culinary vegetables include tomatoes (*Lycopersicon esculentum*), lettuce (e.g., *Lactuca sativa*), green beans (*Phaseolus vulgaris*), lima beans (*Phaseolus limensis*), peas (*Lathyrus* spp.), and members of the genus *Cucumis* such as cucumber (*C. sativus*), cantaloupe (*C. cantalupensis*), and musk melon (*C. melo*). Ornamentals and/or edible flowers include azalea (*Rhododendron* spp.), hydrangea (*Macrophylla hydrangea*), hibiscus (Hibiscus rosasanensis), roses (*Rosa* spp.), tulips (*Tulipa* spp.), daffodils (*Narcissus* spp.), petunias (*Petunia hybrida*) and lavender (*Lavandula*).

Other examples of food crops for which the invention is useful include, but are not limited to, almond, apple, avocado, berries, banana, cacao, carrot, cassava, chili, *citrus*, coconut, coffee, corn, cotton, cucumber, eggplants, fodder beets, grape, hemp, jute, lettuce, mango, melon, olive, onion, palm, peach, peanut, pepper, potato, pumpkin, rapeseed, rice, rubber, squash, soybean, strawberry, sugar beet, sugar cane, sunflower, sweet potato, tea, tomato, walnut, wheat, yam, and also tobacco, nuts, herbs, spices, medicinal plants, tea, pepper, grapevines, hops, the plantain family, edible flowers, and any relatives thereof.

The subject invention can also be used for preventing spoilage of seeds, oil-seed plants, and leguminous plants. Seeds of interest include grain seeds, such as corn, wheat, barley, rice, sorghum, rye, millet, etc. Oil-seed plants include cotton, soybean, safflower, sunflower, *Brassica*, maize, alfalfa, mustard, poppies, palm, coconut, flax, castor, olive etc. Leguminous plants include beans and peas. Beans include guar, locust bean, fenugreek, soybean, garden beans, cowpea, mungbean, lima bean, fava bean, lentils, chickpea, etc.

In some embodiments, the method can prevent and/or control harmful microbial growth on and/or in the food product. Thus, while preventing the alteration and/or decomposition of food products due to microbial growth, the method can also be used to enhance the safety of food products for consumption, e.g., by preventing food poisoning or illnesses from pathogenic food-borne microorganisms.

The subject compositions and methods can be used to prevent and/or control the growth of harmful fungi, bacteria (both Gram-negative and Gram-positive), mold, viruses and many other pests. Non-limiting examples of microbial agents that can cause the spoilage and/or contamination of fresh food products include bacteria, such as *Bacillus, Alicyclobacillus, Geobacillus, Lactobacillus, Proteus, Serratia, Klebsiella, Obesumbacterium, Campylobacter, Clostridrium, Erwinia, Salmonella, Staphylococcus, Shigella, Yersinia, Moraxella, Photobacterium, Thermoanaerobacterium, Desulfotomaculum, Pediococcus, Leuconostoc, Oenococcus, Acinetobacter, Leuconostoc, Psychrobacter, Pseudomonas, Alcaligenes, Serratia, Micrococcus, Flavobacterium, Proteus, Enterobacter, Streptococcus, Xanthomonas campestris, Listeria monocytogenes, Shewanella putrefaciens, Escherichia coli*, and *Vibrio cholerae*; viruses, such as mosaic virus, rotaviruses and hepatitis A; parasites, such as tapeworms, *Trichinella, Giardia lambila,* and *Entamoeba histolytica*; fungi, such as *Botrytis cinerea, Zygosaccharomyces, Debaryomyces hansenii, Saccharomyces, Candida,* and Dekkera/Brettanomyces; and molds, such as *Aspergillus, Fusarium, Cladosporium, Penicillium, Byssochlamys, Mucor, Rhizopus,* and *Alternaria*.

The methods can also be used to control and/or treat various plant pathogens, which can be particularly useful for food crops. Examples of viral infection affecting plants, against which the subject invention is useful, include, but are not limited to, *Carlavirus, Abutilon, Hordeivirus, Potyvirus, Mastrevirus, Badnavirus, Reoviridae Fijivirus, Oryzavirus, Phytoreovirus, Mycoreovirus, Rymovirus, Tritimovirus, Ipomovirus, Bymovirus, Cucumovirus, Luteovirus, Begomovirus, Rhabdoviridae, Tospovirus, Comovirus, Sobemovirus, Nepovirus, Tobravirus, Benyvirus, Furovirus, Pecluvirus; Pomovirus*; all forms of mosaic virus; beet mosaic virus; cassava mosaic virus; cowpea mosaic virus; cucumber mosaic virus; *panicum* mosaic satellite virus; plum pox virus; squash mosaic virus; tobacco mosaic virus; tulip breaking virus; and zucchini yellow mosaic virus Examples of bacterial infections affecting plants, against which the subject invention is useful, include, but are not limited to, *Pseudomonas* (e.g., *P. savastanoi, Pseudomonas syringae* pathovars); *Ralstonia solanacearum; Agrobacterium* (e.g., *A. tumefaciens*); *Xanthomonas* (e.g., *X. oryzae* pv. *oryzae*; *X. campestris* pathovars; *X. axonopodis* pathovars); *Erwinia* (e.g., *E. amylovora*); Xylella (e.g., *X. fastidiosa*); Dickeya (e.g., *D. dadantii* and *D. solani*); *Pectobacterium* (e.g., *P. carotovorum* and *P. atrosepticum*); *Clavibacter* (e.g., *C. michiganensis* and *C. sepedonicus*); Candidatus Liberibacter asiaticus; Pantoea; Ralstonia; Burkholderia; Acidovorax; Streptomyces; Spiroplasma; Phytoplasma; huanglongbing (HLB, *citrus* greening disease); *citrus* canker disease, *citrus* bacterial spot disease, *citrus* variegated chlorosis, *citrus* food and root rot, *citrus* and black spot disease.

In some embodiments, the method can be used simultaneously with other methods of preservation. For example, the method can be used in combination with physical methods of preservation, such as refrigeration, freezing and/or active packaging. In an exemplary embodiment of combination preservation, the preservative composition can be mixed with water and misted onto fresh produce in a refrigerated supermarket produce display.

In some embodiments, the compositions of the subject invention can be used in active packaging systems as a slow-release antimicrobial agent. According to these embodiments, the preservative compositions are incorporated in or on the material in which the food product is packaged, and are gradually released from the packaging rather than being applied directly to the food product.

Advantageously, the compositions and methods of the subject invention can be effective for preserving food and preventing food-borne illnesses without negatively altering the taste, smell, appearance and/or texture of food products.

The methods of the subject invention can be used in a variety of other applications as well. For example, methods are provided wherein the composition is applied to a plant and/or its environment to treat and/or prevent the spread of pests and/or diseases. The composition can be applied to the leaves of the plant, both prior to and/or after harvesting.

In one embodiment, the composition can be used to prevent spoilage and/or contamination of animal feed. For example, methods are provided wherein the composition can be applied to animal feed or water, or mixed with the feed or water, and used to decrease waste of spoiled animal feed, prevent inoculation and/or spread of disease in livestock and aquaculture operations, reduce the need for antibiotic use in large quantities, as well as to provide supplemental proteins and other nutrients.

Local Production of Microbe-Based Products

In certain embodiments of the subject invention, a microbe growth facility produces fresh, high-density microorganisms and/or microbial growth by-products of interest on a desired scale. The microbe growth facility may be located at or near the site of application. The facility produces high-density microbe-based compositions in batch, quasi-continuous, or continuous cultivation.

The microbe growth facilities of the subject invention can be located at the location where the microbe-based product will be used (e.g., a farm). For example, the microbe growth facility may be less than 300, 250, 200, 150, 100, 75, 50, 25, 15, 10, 5, 3, or 1 mile from the location of use.

Because the microbe-based product can be generated locally, without resort to the microorganism stabilization, preservation, storage and transportation processes of conventional microbial production, a much higher density of microorganisms can be generated, thereby requiring a smaller volume of the microbe-based product for use in the on-site application or which allows much higher density microbial applications where necessary to achieve the desired efficacy. This allows for a scaled-down bioreactor (e.g., smaller fermentation vessel, smaller supplies of starter material, nutrients and pH control agents), which makes the system efficient and can eliminate the need to stabilize cells or separate them from their culture medium. Local generation of the microbe-based product also facilitates the inclusion of the growth medium in the product. The medium can contain agents produced during the fermentation that are particularly well-suited for local use.

Locally-produced high density, robust cultures of microbes are more effective in the field than those that have remained in the supply chain for some time. The microbe-based products of the subject invention are particularly advantageous compared to traditional products wherein cells have been separated from metabolites and nutrients present in the fermentation growth media. Reduced transportation times allow for the production and delivery of fresh batches of microbes and/or their metabolites at the time and volume as required by local demand.

The microbe growth facilities of the subject invention produce fresh, microbe-based compositions, comprising the microbes themselves, microbial metabolites, and/or other components of the medium in which the microbes are grown. If desired, the compositions can have a high density of vegetative cells or propagules, or a mixture of vegetative cells and propagules.

In one embodiment, the microbe growth facility is located on, or near, a site where the microbe-based products will be used (e.g., a grocery story), for example, within 300 miles, 200 miles, or even within 100 miles. Advantageously, this allows for the compositions to be tailored for use at a specified location. The formula and potency of microbe-based compositions can be customized for specific local conditions at the time of application, such as, for example, which ore type is being treated; what type of mineral is being extracted; and what mode and/or rate of application is being utilized.

Advantageously, distributed microbe growth facilities provide a solution to the current problem of relying on far-flung industrial-sized producers whose product quality suffers due to upstream processing delays, supply chain bottlenecks, improper storage, and other contingencies that inhibit the timely delivery and application of, for example, a viable, high cell-count product and the associated medium and metabolites in which the cells are originally grown.

Furthermore, by producing a composition locally, the formulation and potency can be adjusted in real time to a specific location and the conditions present at the time of application. This provides advantages over compositions that are pre-made in a central location and have, for example, set ratios and formulations that may not be optimal for a given location.

The microbe growth facilities provide manufacturing versatility by their ability to tailor the microbe-based products to improve synergies with destination geographies. Advantageously, in preferred embodiments, the systems of the subject invention harness the power of naturally-occurring local microorganisms and their metabolic by-products to improve leaching processes.

Local production and delivery within, for example, 24 hours of fermentation results in pure, high cell density compositions and substantially lower shipping costs. Given the prospects for rapid advancement in the development of more effective and powerful microbial inoculants, consumers will benefit greatly from this ability to rapidly deliver microbe-based products.

EXAMPLES

A greater understanding of the present invention and of its many advantages may be had from the following examples, given by way of illustration. The following examples are illustrative of some of the methods, applications, embodiments and variants of the present invention. They are not to be considered as limiting the invention. Numerous changes and modifications can be made with respect to the invention.

Example 1—Test of Preservative Composition Against Various Microorganisms

Standardized suspensions of test strains are prepared of the following microorganisms: *Candida albicans* (ATCC No. 10231), *Aspergillus brasiliensis* (ATCC No. 16404), *Escherichia coli* (ATCC No. 8739), *Pseudomonas aeruginosa* (ATCC No. 9027), and *Staphylococcus aureus* (ATCC No. 6538). The viable microorganisms comprise a freshly growing culture, with the exception of *A. brasiliensis*, which is comprised of spores. Each strain is grown separately using Soybean-Casein Digest broth or agar (*E. coli, P. aeruginosa, S. aureus*) or Sabouraud Dextrose broth or agar (*C. albicans, A. brasiliensis*) medium.

To harvest the bacterial and *C. albicans* cultures, sterile saline TS is used to wash the surface growth, which is then collected in a suitable vessel. To harvest the spores of *A. brasiliensis*, sterile saline TS containing 0.05% of polysorbate 80 is used. The spore suspension is aseptically treated to remove hyphae. All microbial suspensions are prepared to ensure that there is no carryover of residual growth medium from the inoculum (e.g., centrifugation followed by resuspension in appropriate sterile suspending fluid.)

Note: The stock culture organisms may also be grown in a suitable liquid medium (those above) and the cells harvested by centrifugation, then washed and resuspended in appropriate sterile suspending fluid. The microbial suspensions used for inoculation are adjusted to obtain a microbial count of about $1 \times 10^8$ cfu/ml.

Containers are prepared with a preservative composition comprising 0.1% SLP and 0.01% surfactin. Each container is inoculated with one of the prepared and standardized inocula and mixed. The volume of the suspension inoculum used is between 0.5% and 1.0% of the volume of the product to minimize potential effects on the product. The concentration of test microorganisms that are added to the product is such that the final concentration of the test preparation after inoculation is between $1 \times 10^3$ and $1 \times 10^6$ cfu/mL of the product. The initial concentration of viable microorganisms in each test preparation is estimated based on the concentration of microorganisms in each of the standardized inocula as determined by the plate-count method.

The inoculated containers are then incubated at 20-25° C. The number of CFU present in each test prep is determined. Plate counts are conducted using a minimum of duplicate plates, with the CFU averaged before determination of deduced CFU/ml. Treated plates are compared to untreated control plates.

TABLE 1

Average plate counts for control plates versus treated plates for five microorganisms.

| Microorganism | Control | Experimental |
|---|---|---|
| *E. coli* | 21 colonies | 8 colonies |
| *A. brasiliensis* | Large hyphae grown from spores | 0 (empty plate) |
| *C. albicans* | 22 colonies | 6 colonies |
| *S. aureus* | 26 colonies | 9 colonies |
| *P. aeruginosa* | 34 colonies | 12 colonies |

We claim:

1. A method for extending the consumable life of a food product, comprising contacting a food preservative composition with the food product, wherein said food preservative composition comprises a microorganism, and/or a glycolipid, wherein
    said microorganism comprises *Starmerella bombicola, Saccharomyces cerevisiae, Pseudozyma aphidis, Pichia guilliermondii* or *Pichia anomala*,
    said glycolipid comprises a sophorolipid or a mannosylerythritol lipid, a total concentration of the glycolipid in the food preservative composition being from about 0.005% to about 1.0%, and
    the food preservative composition at said concentration is in the food product to be consumed.

2. The method of claim 1, comprising about 300 ppm to about 800 ppm of said glycolipid.

3. The method of claim 1, comprising at least about 0.1% sophorolipid.

4. The method of claim 1, wherein the composition is contacted with the food product by spraying, dipping, spreading, misting, or mixing.

5. The method of claim 1, wherein said microorganism is an active form, inactive form, or a combination thereof.

6. The method of claim 1, used to prevent and/or control harmful microbial growth on a food product.

7. The method of claim 1, used to prevent the alteration and/or decomposition of a food product.

8. The method of claim 1, wherein said glycolipid comprises a mannosylerythritol lipid.

9. The method of claim 1, wherein said food product is a seafood after harvest.

* * * * *